United States Patent [19]

Anderson et al.

[11] Patent Number: 6,074,453

[45] Date of Patent: Jun. 13, 2000

[54] ULTRAFINE HYDROGEN STORAGE POWDERS

[75] Inventors: Iver E. Anderson, Ames, Iowa; Timothy W. Ellis, Doylestown, Pa.; Vitalij K. Pecharsky, Ames, Iowa; Jason Ting, Ames, Iowa; Robert Terpstra, Ames, Iowa; Robert C. Bowman, La Mesa, Calif.; Charles K. Witham; Brent T. Fultz, both of Pasadena, Calif.; Ratnakumar V. Bugga, Arcadia, Calif.

[73] Assignees: Iowa State University Research Foundation, Inc., Ames, Iowa; California Institute of Technology, Pasadena, Calif.

[21] Appl. No.: 08/959,167

[22] Filed: Oct. 28, 1997

Related U.S. Application Data

[60] Provisional application No. 60/029,393, Oct. 30, 1996.

[51] Int. Cl.[7] ................................. B22F 3/00; B22F 1/00
[52] U.S. Cl. ................................. 75/245; 75/252; 75/338; 420/900; 429/209; 419/31; 419/62; 148/513
[58] Field of Search ............................. 75/338, 245, 252; 420/900; 429/209; 419/31, 62; 148/513

[56] References Cited

U.S. PATENT DOCUMENTS

| | | | |
|---|---|---|---|
| 5,125,574 | 6/1992 | Anderson et al. | 239/8 |
| 5,219,678 | 6/1993 | Hasebe et al. | 429/59 |
| 5,277,705 | 1/1994 | Anderson et al. | 55/319 |
| 5,372,629 | 12/1994 | Anderson et al. | 75/332 |
| 5,605,585 | 2/1997 | Yamamoto et al. | 148/513 |
| 5,654,115 | 8/1997 | Hasebe et al. | 429/218 |
| 5,738,953 | 4/1998 | Lichtenberg et al. | 429/59 |

*Primary Examiner*—Ngoclan Mai

[57] ABSTRACT

A method of making hydrogen storage powder resistant to fracture in service involves forming a melt having the appropriate composition for the hydrogen storage material, such, for example, $LaNi_5$ and other $AB_5$ type materials and $AB_{5+x}$ materials, where x is from about −2.5 to about +2.5, including x=0, and the melt is gas atomized under conditions of melt temperature and atomizing gas pressure to form generally spherical powder particles. The hydrogen storage powder exhibits improved chemcial homogeneity as a result of rapid solidfication from the melt and small particle size that is more resistant to microcracking during hydrogen absorption/desorption cycling. A hydrogen storage component, such as an electrode for a battery or electrochemical fuel cell, made from the gas atomized hydrogen storage material is resistant to hydrogen degradation upon hydrogen absorption/desorption that occurs for example, during charging/discharging of a battery. Such hydrogen storage components can be made by consolidating and optionally sintering the gas atomized hydrogen storage powder or alternately by shaping the gas atomized powder and a suitable binder to a desired configuration in a mold or die.

28 Claims, 10 Drawing Sheets

ULTRAFINE HYDROGEN STORAGE POWDERS

This application claims the benefits of U.S. Provisional Application Ser. No. 60/029,393 filed Oct. 30, 1996.

CONTRACTURAL ORIGIN OF THE INVENTION

The United States Government has rights in this invention pursuant to Contract No. W-7405-Eng-82 between the Department of Energy and Iowa State University.

FIELD OF THE INVENTION

The present invention relates to ultrafine hydrogen storage alloy powders and components and their manufacture.

BACKGROUND OF THE INVENTION

Hydrogen storage materials are of interest with respect to devices that employ the reversible gas phase absorption/desorption of hydrogen. Such devices include, but are not limited to, rechargeable batteries, hydrogen storage, pumping and compression systems, and hydrogen storage units, hydrogen absorption refrigerators (or cryocoolers) and other devices that involve the reversible gas phase absorption/desorption of hydrogen.

Certain compounds are candidates for use as hydrogen storage materials. These compounds include, but are not limited to, $LaNi_5$ and other compounds of the $AB_5$ type, such as $YNi_5$, $CeNi_5$, $MmNi_5$ where Mm is mischmetal, and $MmNi_{3.5}Co_{0.8}Al_{0.4}Mn_{0.3}$ which have a hexagonal Laves phase stucture with advantageous hydrogen storage characteristics. These hydrogen storage materials typically are manufactured by forming a melt of appropriate composition, casting the melt as an ingot, and mechanically crushing the ingot to produce powder having acicular particle configurations for the most part. The cast and crushed powder making technique suffers from numerous disadvantages including chemical inhomogeneity of the crushed powder produced as a result of chemical segregation effects that occurs during ingot solidification. Chemical inhomogeneity of the powders exerts an adverse effect on the hydrogen absorption pressure/temperature response of the material and produces inconsistent hydrogen absorption properties that can limit performance of hydrogen storage components produced from such cast and crushed powders. Therefore, lengthy and energy consuming heat treatments must be performed to homogenize chemical composition across the castings prior to crushing.

Moreover, hydrogen storage components such as electrodes for electrochemical energy storage devices made from the cast and crushed powder can suffer mechanical fracture and component failure due to the extreme volume expansion/contraction cycle that the particulate material experiences (on the order of 25% strain) during hydrogen absorption/desorption cycling of the component in service. For example, $LaNi_5$ type alloys used as electrodes in nickel/metal hydride (Ni/MeH) battery systems exhibit energy storage capacity reduction and eventual inactivity because fracture of individual particles that form the negative electrode cause internal open circuits which merge to break general contact with the battery electrode. Mechanical fracture of the electrode can result in loss of active material from the electrode and/or electrical shorting as a result of bridging of the fractured electrode with the battery separator.

Avoidance of electrode fracture thus is important to preserve the electrode operating function and battery performance.

The present invention has an object to provide ultrafine hydrogen storage alloy powders, components and method of making same that overcome the aforementioned disadvantages associated with the cast, heat treat, and crush technique for making hydrogen storage powders.

SUMMARY OF THE INVENTION

In accordance with an embodiment of the present invention, a melt is formed having the appropriate composition for the hydrogen storage material, such as, for example, the aforementioned $LaNi_5$ and other $AB_5$ and $AB_{5+x}$ type materials, where the melt is gas atomized under conditions of melt temperature and atomizing gas pressure to form generally spherical powder particles in the size range of about 1 to 100 microns diameter. Gas atomized powder in accordance with an embodiment of the present invention exhibits improved chemical homogeneity as a result of rapid solidfication from the melt and a small particle size and substantially spherical particle shape that is more resistant to microcracking during hydrogen absorption/desorption cycling.

In accordance with another embodiment of the present invention, a hydrogen storage component, such as in particular an electrode for a battery or electrochemical energy storage cell, made from the gas atomized hydrogen storage material is resistant to dilation-induced degradation upon hydrogen absorption/desorption that occurs for example, during charging/discharging of a battery. Such hydrogen storage components can be made by consolidating and optionally sintering the gas atomized hydrogen storage powder or alternately by shaping the gas atomized powder and a suitable binder to a desired configuration in a mold or die.

The objects and advantages of the present invention will become more readily apparent from the following detailed description taken with the following drawings.

DETAILED DESCRIPTION OF THE INVENTION

Figure 1:
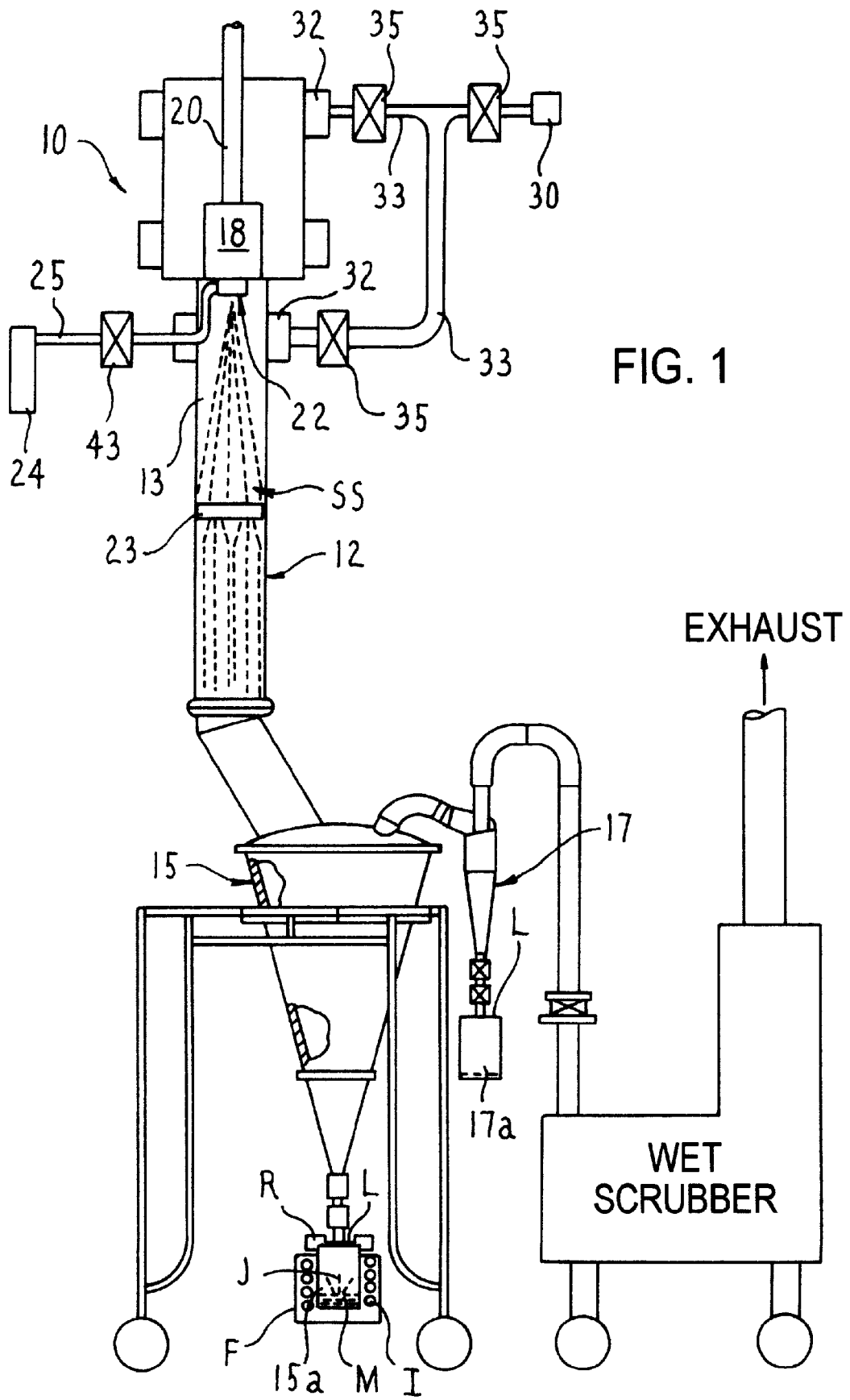
FIG. 1 is a schematic view of a high pressure gas atomization apparatus useful in practicing the present invention.

Referring to FIG. 1, a high pressure gas atomization apparatus is shown for practicing one illustrative embodiment of the present invention. However, the invention is not limited to high pressure gas atomization of the melt and can be practiced using other gas atomization techniques as well as centrifugal atomization techniques such as wherein a suitable alloy melt is directed onto a rotating disc in a manner to atomize the melt. Further, a rotating rod comprising a suitable alloy can be melted at the rod end during rotation to centrifugally atomize the molten alloy therefrom. Another gas atomization technique useful in practicing the invention involves a vacuum/soluble gas technique wherein a filled melt crucible is charged with high pressure of dissolved gas and then the melt is released through an orifice into a low pressure spray chamber, causing melt disintegration.

The apparatus of FIG. 1 includes a melting chamber 10 and a drop tube 12 located beneath the melting chamber and defining an atomizing chamber 13. The melting chamber 10 includes an induction melting furnace 18 and a vertically actuated stopper rod 20 for controlling flow of melt from the furnace 18 to a melt atomizing nozzle 22 disposed between the furnace and the atomizing chamber. The atomizing nozzle 22 is supplied with an atomizing gas (e.g. argon) from a suitable source 24, such as a conventional bottle or cylinder of the appropriate gas. The atomizing nozzle 22 atomizes the alloy melt in the form of a supersonic spray SS containing generally spherical, molten droplets of melt discharged into the atomizing chamber 13. The droplets rapidly solidify (e.g. cooling rate greater than 10,000 degrees C/second) in the atomizing chamber 13 to form generally spherical powder. If higher cooling rates are needed to enhance chemical homogeneity, helium atomization gas can be used because of its greater thermal conductivity and heat capacity.

The atomizing nozzle 22 preferably is of the supersonic high pressure type described in detail in the Anderson U.S. Pat. No. 5,125,574, the teachings of which are incorporated herein by reference. The atomizing nozzle 22 is supplied with an atomizing gas through conduit 25 and open/close valve 43. As shown in FIG. 1, the atomizing nozzle 22 atomizes the melt in the form of a supersonic spray SS containing generally spherical, molten droplets of melt discharged into the atomizing chamber 13. The droplets solidify quite rapidly in the atomizing chamber 13 to form generally spherical powder. Both the melting chamber 10 and atomizing chamber 13 are connected to an evacuation device (e.g. vacuum pump) 30 via suitable ports 32 and conduits 33. Prior to melting and atomization of the melt, the melting chamber 10 and atomizing chamber 13 are evacuated to a level of approximately $10^{-4}$ atmosphere to substantially remove ambient air. Then, the evacuation system is isolated from the chambers 10, 13 via the valves 35 and the chambers 10, 13 are positively pressurized by inert gas (e.g. argon to about 1.1 atmosphere) to prevent entry of ambient air.

In practicing a method of the invention, the drop tube 12 can have a generally circular cross-section of 1 foot diameter and a length of 10 feet.

The powder produced in the atomizing chamber 13 is separated from the atomization gas stream and collected in a collector system comprising a primary conical collector 15 having a powder collection container 15a and a secondary cyclone collector 17 also having a powder collection container 17a. The gas stream then passes through a wet scrubber before being exhausted to the atmosphere. The powder collector system comprising the primary collector 15 and the secondary collector 17 is described in Anderson U.S. Pat. No. 5,277,705, the teachings of which are incorporated herein by reference. The powder produced in the atomizing chamber 13 can also be collected in the manner described in the aforementioned Anderson U.S. Pat. No. 5,125,574 incorporated herein by reference, or in other common cyclone-type collectors. If measurements show that a brief homogenization anneal is needed to get optimum performance from the as-atomized powders, the two collection containers 15a and 17a can be used as furnace retort vessels by sliding thereabout a respective heating furnace shell F (shown for container 15a only for convenience, the furnace for container 17a being he same). The furnace F can provide either induction or resistance heating such as, for example, using induction coil I. A water cooling ring R can be clamped around the junction of each container lid L and container 15a, 17a so as to provide cooling to regions of the lid and container proximate an o-ring seal (not shown) residing at the junction so as to protect the seal from thermal damage. The containers 15a, 17a may be provided with inert or other gas manifold M therein proxmate a bottom of the container to provide inert gas jets J (one shown) in a manner to effect powder fluidizing during the homogenization anneal. These annealing treatments make use of the inert process gas atmosphere in the atomization chamber immediately after completion of an atomization run and involve the full powder yield in the containers 15a, 17a. After the in-situ anneal, the powder needs only a top size screening before fabrication into an electrode or other shape.

A method of the invention as well as hydrogen storage alloy powders and components will be described herebelow for purposes of illustration, not limitation, with respect to manufacture of a rapidly solidified $LaNi_5$, $MmNi_{3.5}Co_{0.8}Al_{0.4}Mn_{0.3}$, $LaNi_{4.75}Sn_{0.25}$ and $LaNi_{4.85}Sn_{0.15}$ hydrogen storage powder. Furthermore, the invention can be practiced to produce $LaNi_{5.2}Sn_{0.3}$ hydrogen storage powders from the off-stoichiometric alloys having the atomic formula $AB_{5+x}$, where x varies from about −2.5 to about +2.5. The range of compositions with x ranging from about 0 to about +2.5 is specially advantageous in that the B-component is solidified rapidly as finely dispersed second phase inside the gas atomized particles. The advantages are apparent from the fact that this finely dispersed second phase mainly consists of pure B-component (or a solid solution based on B-component), which is typically a transition metal, e.g. Co, Ni, Fe, Cu, Mn, Ti, Cr, Nb, Ta. Therefore, first the presence of this finely dispresed second phase improves mechanical properties of the gas atomized hydrogen absorption particles, making them better resistant to fracture upon hydrogen absorption/desorption and battery charge/discharge cycling; and second, it provides the presence of electrical conductive grains or phase components inside the hydrogen absorption particles, allowing smaller resistance losses upon charging/discharging of the Ni/MeH batteries.

However, the invention is not limited to these specific hydrogen storage alloys and can be practiced to make other hydrogen storage alloy powders of the type having the approximate atomic formula $AB_5$ and $AB_{5+x}$ that exhibit similar hydrogen capacity and absorption isotherm behavior to render them suitable as hydrogen storage powder and where A can be a lanthanide element or mischmetal (Mm) and B can be one or more of a transition metal; e.g. Co, Ni, Fe, Cu, Mn, Ti, Cr, Nb, Ta, and a p-electron element; e.g. Al, Si, Ge, B, Sb, Ga, and Sn.

In the illustrative embodiments described herebelow, the aforementioned hydrogen storage powders were made by charging prealloyed ingot material having the selected $LaNi_5$, $MmNi_{3.5}Co_{0.8}Al_{0.4}Mn_{0.3}$, $LaNi_{4.85}Sn_{0.15}$ $LaNi_{5.2}Sn_{0.3}$ or $LaNi_{4.75}Sn_{0.25}$ composition into a high purity, fine grain, high fired alumina crucible (not shown) disposed within the melting furnace described hereabove having a stopper rod and pour tube of alumina also.

The prealloyed ingot material was made by melting the elemental components (e.g. La and Ni for $LaNi_5$) using a bottom pour chill casting technique in which the elemental consitutents were melted in proper proportions at 1500 degrees C in an alumina crucible with an alumina stopper rod. The elemental constituents were of commercial quality having 99.9% or better purity by weight. The melt was bottom poured by raising the stopper rod and releasing a molten alloy stream into a water cooled copper ingot mold having dimensions of 1 inch diameter by 12 inch length. Each ingot weighed approximately 2.5 pounds.

Prior to melting of the ingot charge in the atomizer crucible in the melting furnace 18, the melting chamber 10 was initially evacuated to $75 \times 10^{-3}$ Torr and then backfilled with ultrahigh purity argon to 1.1 atmosphere. The ingot charge (e.g. La and Ni for $LaNi_5$) placed in the melting crucible was induction heated and melted to promote good melt homogeneity and to provide a melt temperature of 1475 degrees C, corresponding to a melt superheat of 125 degrees C above the alloy melting temperature of 1350 degrees C. The melt was maintained at temperature for 2 minutes to stablize the melt temperature and to homogenize the molten alloy, Once the melt temperature was stabilized, the alumina stopper rod was raised to release the melt for flow (flow rate of 60 grams/second) through a machinable alumina melt pour or supply tube communicated to the atomizing nozzle 22 for atomization by the high pressure argon gas jets of the atomizing nozzle 22 as described in aforementioned U.S. Pat. No. 5,125,574. The superheated melt of each alloy composition was atomized using ultrahigh purity argon gas at a pressure of 1100 psig, for example, as measured at the gas regulator of supply 24. However, the $LaNi_{4.85}Sn_{0.15}$ and $LaNi_{5.2}Sn_{0.3}$ alloys were atomized with helium at 800 psig using the same nozzle and other parameters.

The atomized melt was discharged from the atomizing nozzle 22 into the atomizing chamber 13 of the drop tube 12 for rapid soldification of the molten atomized alloy droplets to form generally spherical powder particles. During freefall of the particle in the atomizing chmaber 13, the gas flow from a nitrogen jet ring 23 operated at 250 psig impinged on the particle spray to promote a mild passivation reaction on the partially solidified particle surfaces. Further passivation of the particle surfaces occured as they passed through a zone of carbonaceous material resulting from decompositon of a layer of "DUCO" cement that had been placed on the lower inside wall of the slanted tube that transported the solidified powder into the primary collection chamber 15. The passivation treatment is practiced as described in Anderson U.S. Pat. No. 5,372,629, the teachings of which are incorporated herein by reference. The second carbonaceous passivation step was omitted in the atomization of the $LaNi_{4.85}Sn_{0.15}$ and $LaNi_{5.2}Sn_{0.3}$ alloys to modify the hydrogen activation behavior. In addition to the passivation function applied by this approach, alternative particle surface treatment can be used to affect subsequent chemical activity in a battery application; e.g. to promote sustained hydrogen transport for extended cycling life. The time required to atomize the superheated $LaNi_5$ melt composition in the crucible was about 16 seconds, typical for these alloys.

The atomized melt discharged to the atomizing chamber was collected in the manner described above and analyzed chemically and by X-ray diffraction. The batches of as-atomized powders of different composition were maintained under inert gas in the drop tube and the collection containers until the system and the powders cooled to room temperature. To collect the full yield of powder from each batch, the chamber 13 was opened to ambient atmosphere to permit collection from various interior accumulation points; e.g. the access ports. Powder retained in the collection containers under inert atmosphere was combined with the powder collected from the chamber interior after each run during an inital powder separation and blending operation within a glove box having an inert atmosphere. Powders were stored in the glove box until used for subsequent testing. The yield of atomized powder was greater than 90% of the starting melt amount. Table 1 sets forth the chemical analysis of the $LaNi_5$ powder produced.

TABLE 1

| Chemistry of the as Atomized $LaNi_5$ Powder. | | |
|---|---|---|
| Chemistry | Result | Method |
| La/Ni ratio | 1/5 at. | ICP-AES |
| Carbon Content | 367 ppm wt | Combustion. |
| Nitrogen Content | 92 ppm wt. | Inert Gas Fusion |
| Oxygen Content | 360 ppm wt. | Inert Gas Fusion |

ICP-AES is induction coupled plasma atomic emission spectroscopy. Table 1 reveals, for this typical alloy powder batch, that the stoichiometry of the $LaNi_5$ compound was maintained from the starting composition and that the as-atomized powder exhibited a low interstitial contamination level from oxygen. The enhanced carbon and nitrogen measurements probably reflect the effects of the powder surface passivation treatment that involves these elements. The chemical composition of the $MmNi_{3.5}Co_{0.8}Al_{0.4}Mn_{0.3}$, $LaNi_{4.85}Sn_{0.15}$, $LaNi_{5.2}Sn_{0.3}$ and $LaNi_{4.75}Sn_{0.25}$ hydrogen storage powders were analyzed also with similar results.

Figure 2:
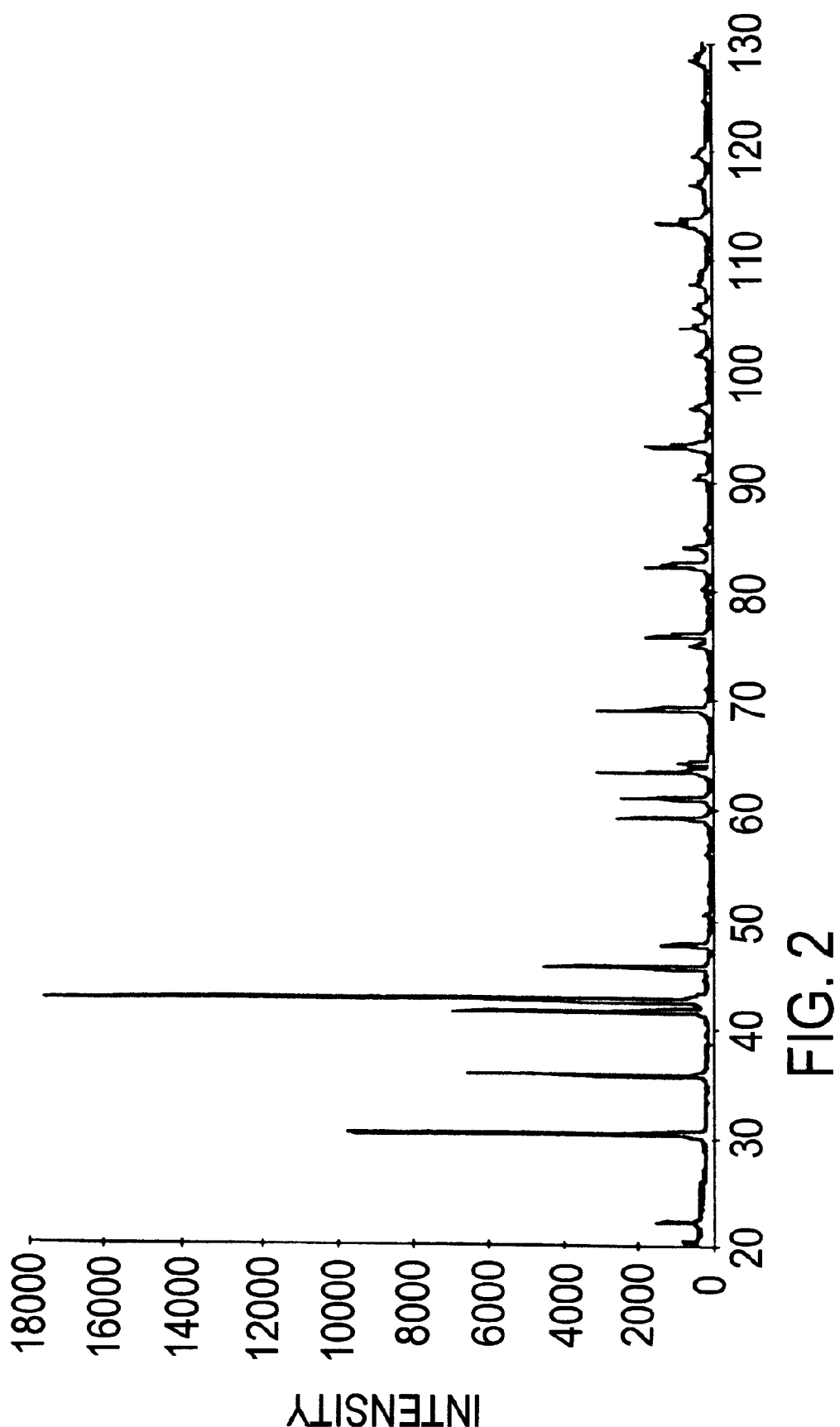
FIG. 2 is an X-ray diffraction pattern of as-atomized $LaNi_5$ hydrogen storage powder pursuant to the present invention.
Figure 3:
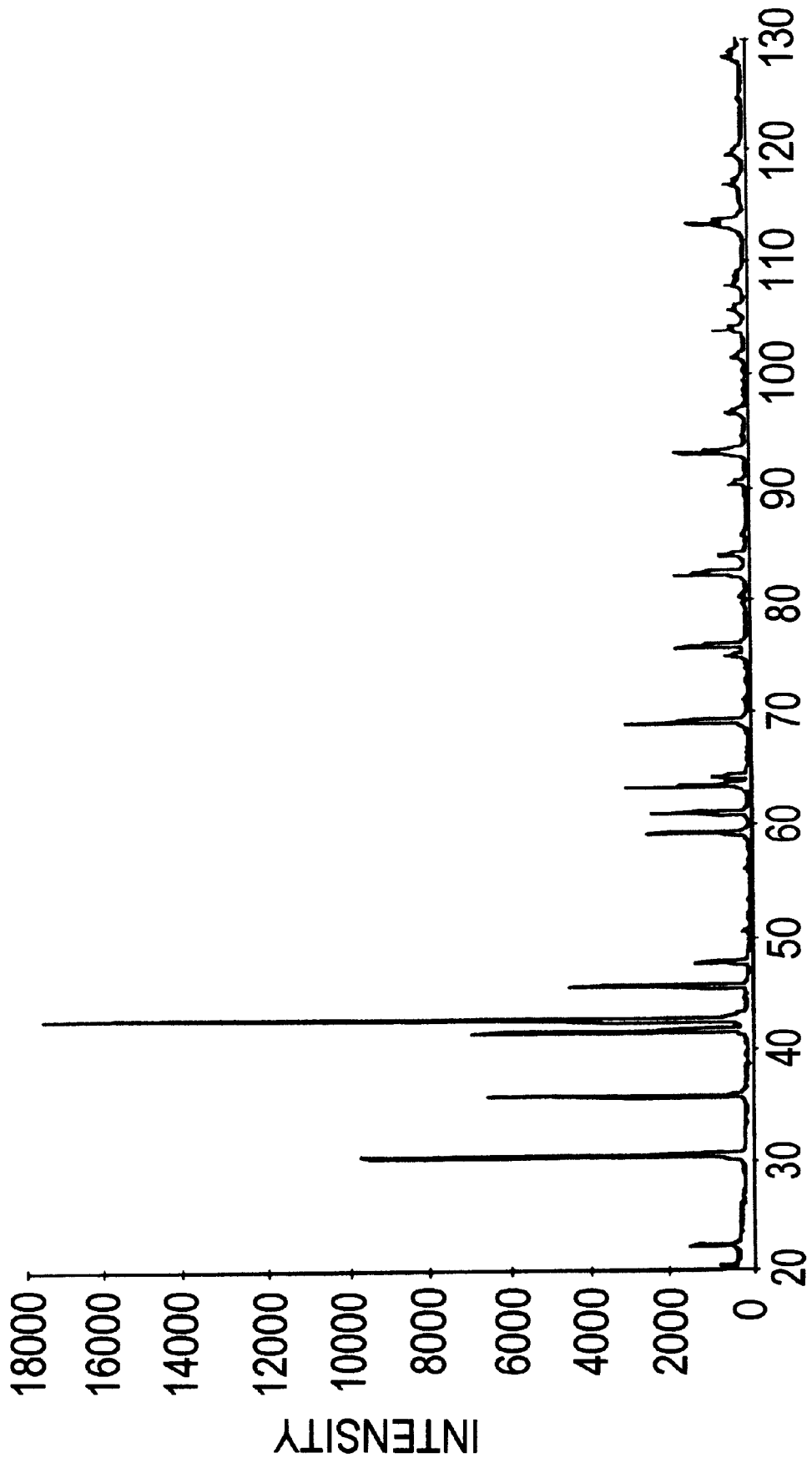
FIG. 3 is an X-ray diffraction pattern of as-atomized $MmNi_{3.5}Co_{0.8}Al_{0.4}Mn_{0.3}$ hydrogen storage powder pursuant to the present invention.
Figure 4:
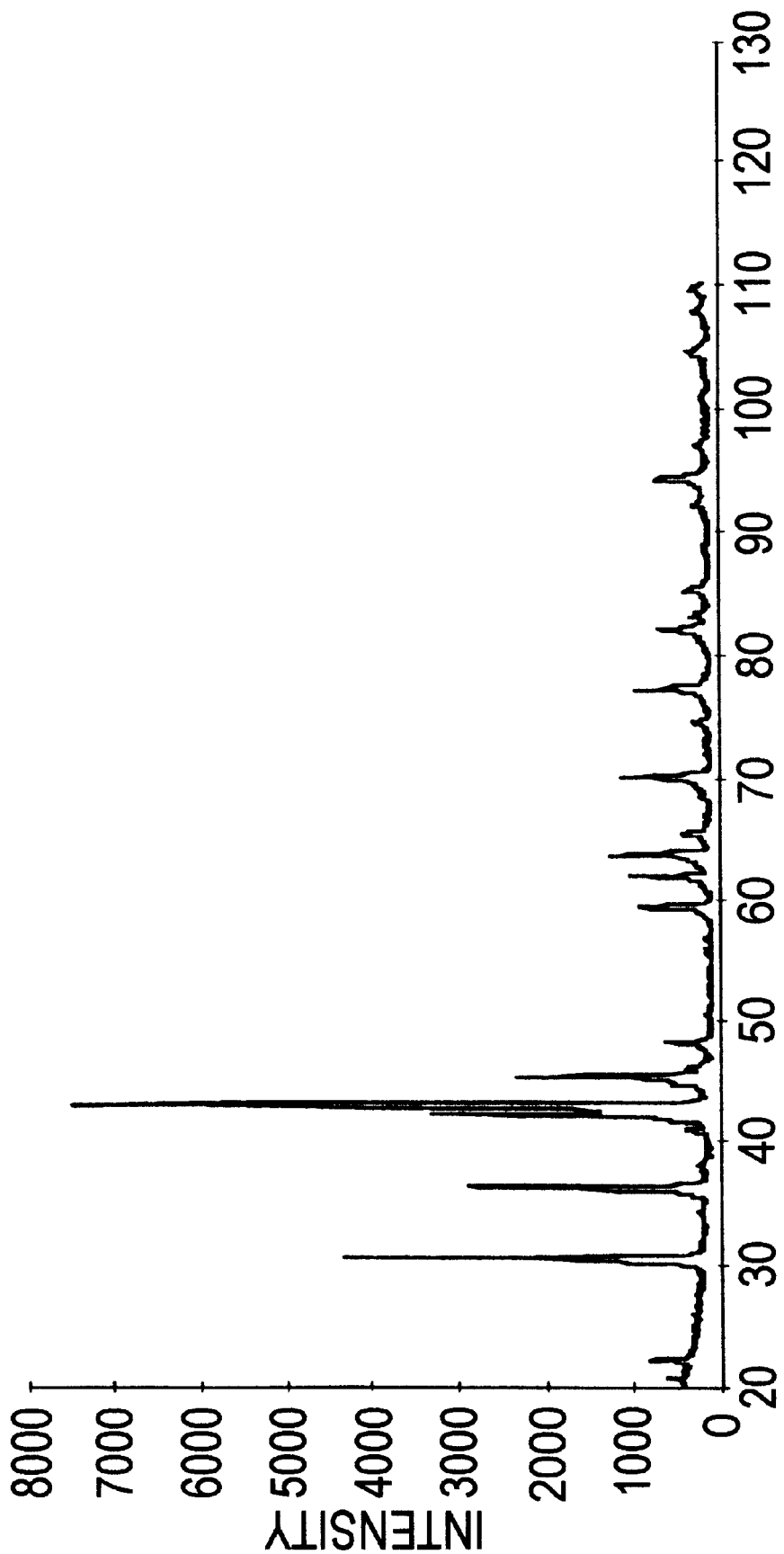
FIG. 4 is an X-ray diffraction pattern of as-atomized $LaNi_{4.75}Sn_{0.25}$ hydrogen storage powder pursuant to the present invention.

The collected atomized powder also was analyzed by X-ray diffraction to determine powder particle crystal structure. FIGS. 2, 3, and 4 are X-ray diffraction patterns of as-atomized $LaNi_5$, $MmNi_{3.5}Co_{0.8}Al_{0.4}Mn_{0.3}$, and $LaNi_{4.75}Sn_{0.2}$, hydrogen storage powders, respectively, pursuant to the present invention. As indicated by the crossed diamonds, all the diffraction peaks, except those for two very minor ones, are due to the $LaNi_5$, hexagonal close packed crystal structure. Thus, the diffraction analysis showed that the powders produced pursuant to the invention to be the singular hexagonal Laves phase of $LaNi_5$, which is the desired crystallography for these compounds or alloys.

Figure 9:
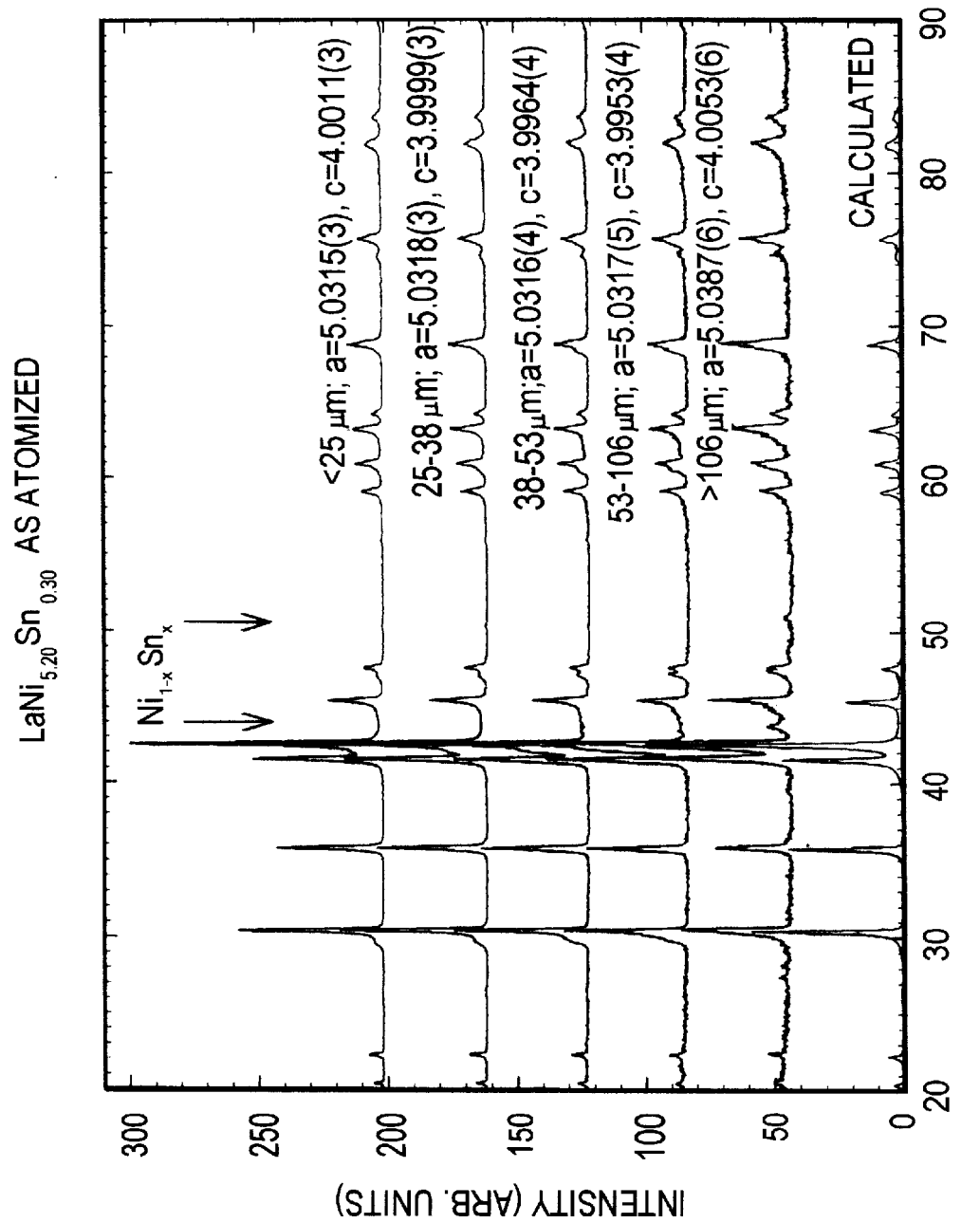
FIG. 9 is an X-ray diffraction pattern summary of as-atomized $LaNi_{5.2}Sn_{0.3}$ hydrogen storage powder of different particle sizes, e.g. less than 25 micron (um), 25–38 micron, and so on, pursuant to the invention with measured and calculated lattice parameters a, c.

The determination that a $LaNi_5$-type phase is the sole solidification product phase in the gas atomized powders is subject to the limits of x-ray diffraction measurements which are capable of detecting a minimum of about 5 volume % of a secondary phase. FIG. 9 is an X-ray diffraction pattern of as-atomized off-stoichiometric alloy $LaNi_{5.2}Sn_{0.3}$ pursuant to the invention. It shows that there is essentially no dependence of the lattice parameters as a function of particle size, which means that the as-solidified particle composition remains essentially constant in a wide range of particle sizes from about 1 micron to about greater than 100 microns. As indicated by arrows on FIG. 9, the larger particles (greater than 50 microns) contain a detectable amount of the solid solution of Sn in Ni. As particle size decreases, the X-ray diffraction becomes unsuitable to detect the presence of finely distributed second phase. Although not wanting to be bound by theory, the inventors believe that the grains of the second phase become too small to diffract X-rays and, therefore, only short range order exists in finely distributed Ni-based solid solution phase. Thus, the diffraction analysis of the as gas-atomized, off-stoichiometric alloy showed that the powders pursuant to the invention are hexagonal $LaNi_5$-type phase with small amount of second phase distributed inside the particles.

Figure 5A:
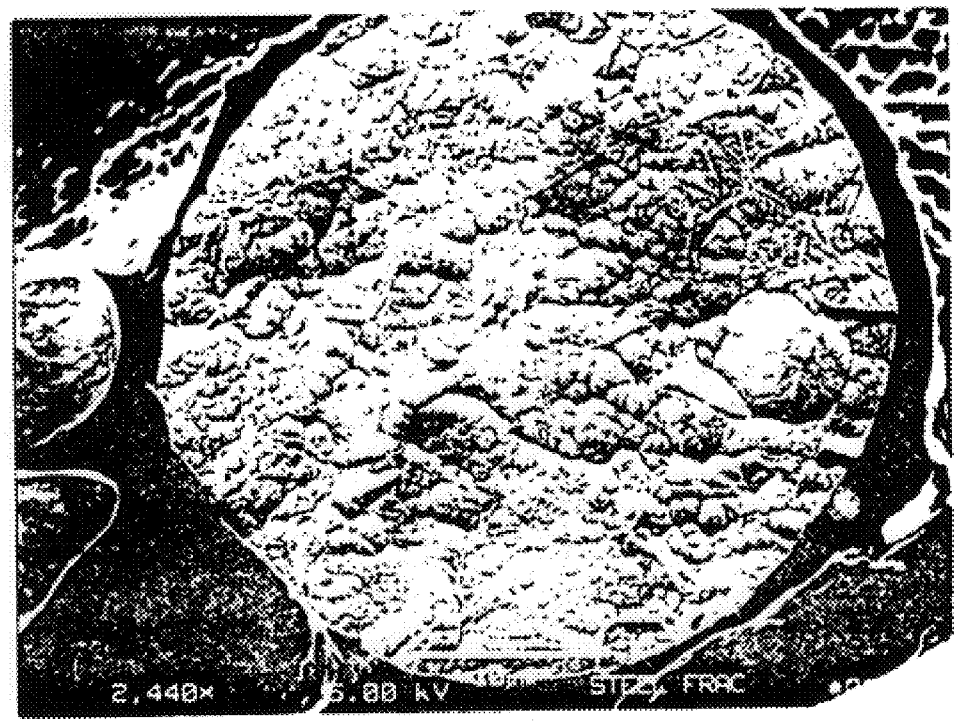
FIG. 5a and 5b are scanning electron micrographs of cross-sectioned and etched samples of as-atomized $LaNi_5$ hydrogen storage powder pursuant to the present invention and a chill cast $LaNi_5$ alloy, respectively, FIG. 5a having a scale of 10 microns as shown and FIG. 5b having a scale of 250 microns as shown.
Figure 5B:

It should be noted that the solidification morphology of larger $LaNi_5$ powders, greater than about 10 microns diameter, solidify in a cellular morphology, as shown in FIG. 5a which indicates that some minor amount of alloy segregation occurred within the atomized particles. However, the segregation is on such a fine scale (cell spacing of about 1 micron shown in the SEM micrograph of a particle cross-section in FIG. 5a) that it is below the resolution limit of auger electron spectroscopy measurements of the surface composition. Similar microstructural observations of $LaNi_5$ powders finer than about 10 microns diameter suggest that single phase nearly segregation-free powders are a typical result of the gas atomization process described above.

An important additional observation should be made about FIGS. 4 and 9 which show the x-ray diffraction results for $LaNi_{4.75}Sn_{0.25}$ and $LaNi_{5.2}Sn_{0.3}$, respectively, as gas atomized powders with different particle sizes shown. Inspection of the peak shape of the reflections for the hexagonal $LaNi_5$-type phase indicate an asymetry with a peak broadening to the direction of lower 2-theta values. This observation is consistent wth the hypothesis that segregation of the Sn solute element, presumably to the cell boundaries of the powders greater than about 10 microns diameter, causes sufficient expansion of the hexagonal phase in the cell boundary region to make this effect observable even though the volume fraction of the cell boundary phase is still small.

Figure 7A:
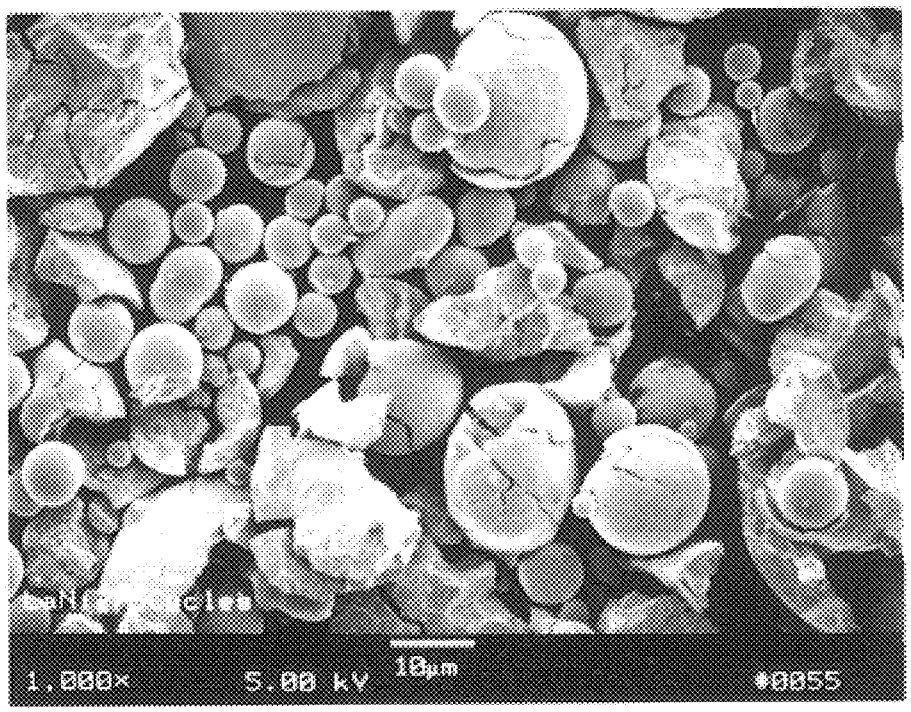
FIG. 7a and 7b are scanning electron micrographs of as-atomized $LaNi_5$ and $LaNi_{4.75}Sn_{0.25}$ (GA-gas atomized) hydrogen storage powders, respectively, pursuant to the present invention after activation for 5 cycles.
Figure 7B:
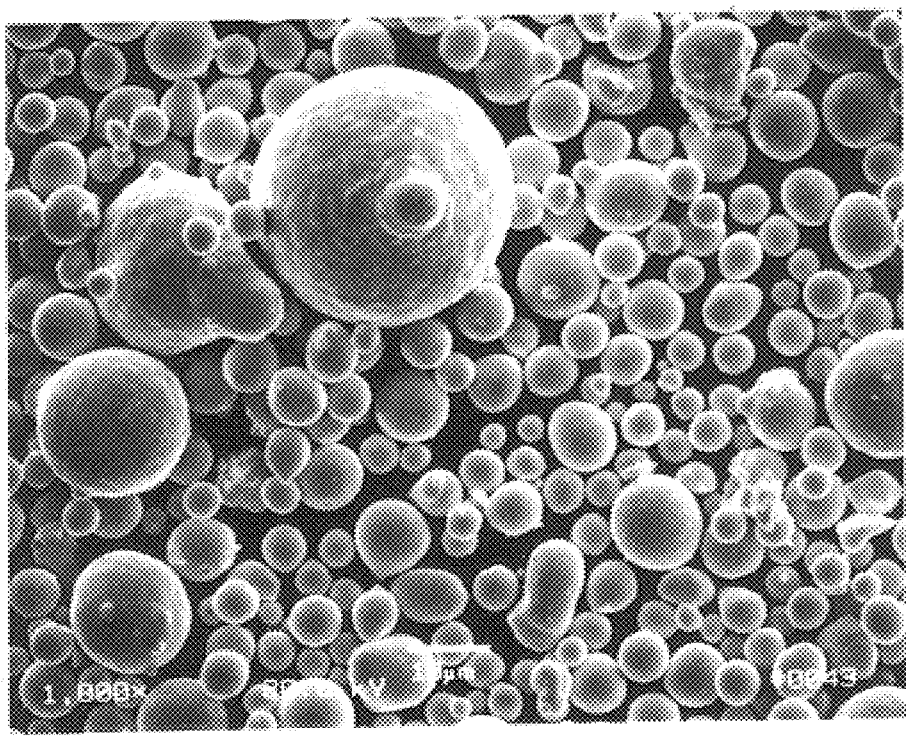

The exemplary spherical morphology of the as-atomized powder pursuant to the invention is illustrated in FIG. 7a, which is a scanning electron micrograph of as-atomized $LaNi_5$ hydrogen storage powder after 5 activation cycles. The morphology of the as-atomized and cycled $LaNi_{4.75}Sn_{0.25}$ hydrogen storage powder shown in FIG. 7b is essentially identical.

The as-atomized powder particles for each argon or helium atomized alloy exhibited a particle size in the range of about 1 to about 100 microns diameter as determined by scanning electron micrographs. The majority (e.g. 80%) of the as-atomized powder particles of each argon atomized alloy composition was less than 75 microns in diameter. The majority (e.g. 80%) of the helium atomized alloy powder particles was less than 20 microns in diameter. The mean particle size of the as-atomized powder for each argon atomized alloy composition was determined to be in the range of about 20 to about 30 microns diameter, typically 25 microns diameter mean particle size. The mean particle size of the helium atomized alloy powder was determined to be 8 to 10 microns diameter.

The observed hexagonal phase of the as-atomized $LaNi_5$, $MmNi_{3.5}Co_{0.8}Al_{0.4}Mn_{0.3}$, $LaNi_{4.75}Sn_{0.25}$, $LaNi_{5.2}Sn_{0.3}$ and $LaNi_{4.85}Sn_{0.15}$ powder particles and their spherical morphology render the powder particles pursuant to the invention ideal starting materials for conventional powder metallurgical techniques for the production of monolithic hydrogen storage components or bodies, such as for example only, electrodes for electrochemical batteries, hydrogen fuel storage particulate media, and hydrogen absorption refrigerators.

Figure 6:
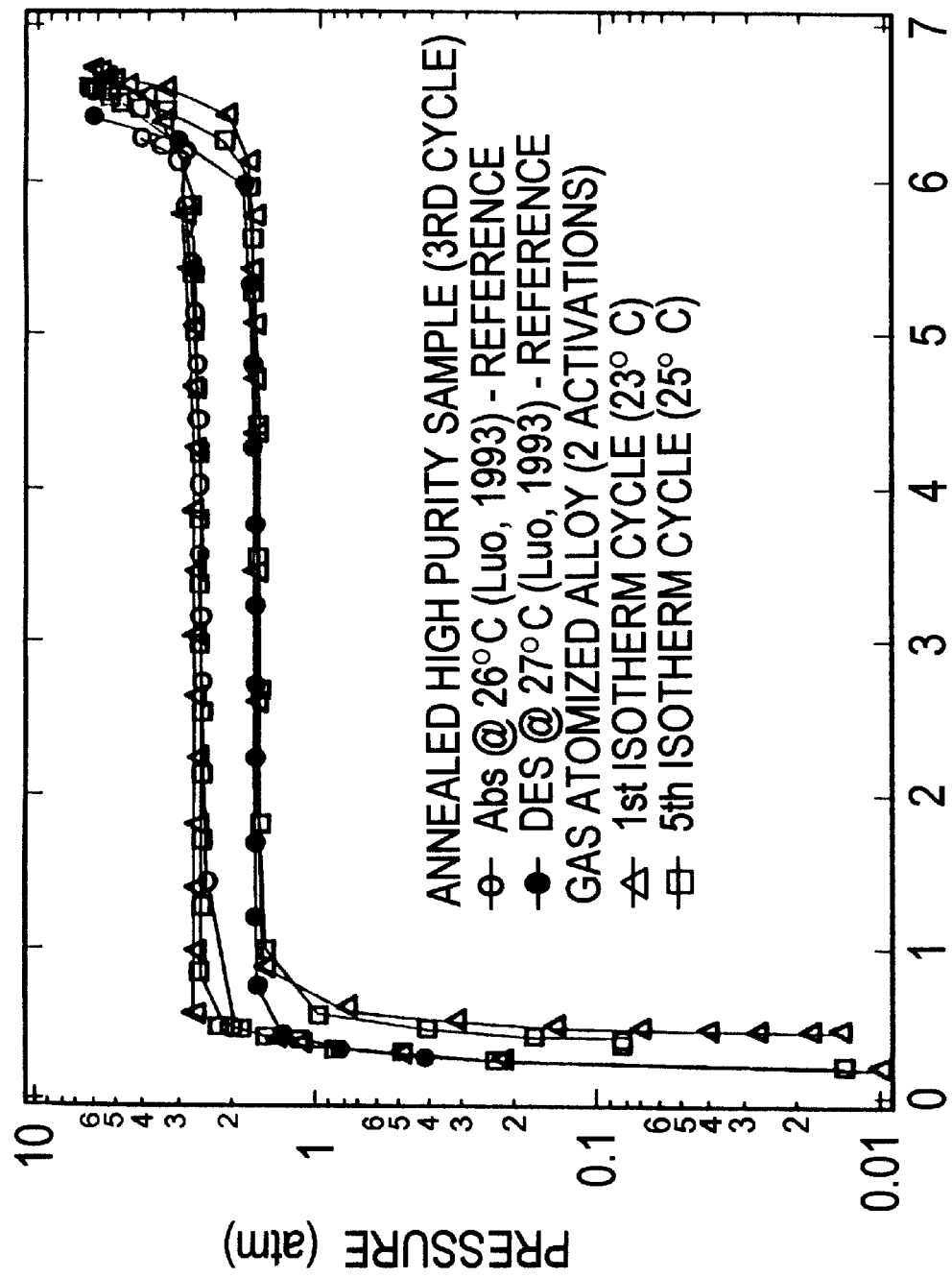
FIG. 6 is a graph of the room temperature hydrogen gas pressure isotherm versus hydrogen absorption for as-atomized $LaNi_5$ hydrogen storage powder pursuant to the present invention.

Referring to FIG. 6, the hydrogen gas pressure isotherm versus hydrogen absorption for gas atomized $LaNi_5$ hydrogen storage powder pursuant to the present invention is illustrated. This graph was generated by an automated all-metal (316 grade stainless steel) Sievert's gas-volumetric apparatus. Prior to generation of this room temperaure hydrogen absorption isotherm, the gas atomized powders were subject to a single hydrogen absorption-desorption cycle in the closed vessel to "activate" them by heating from room temperature to 200 degrees C under an initial hydrogen pressure of 150 psig to fully absorb hydrogen into the powder. The desorption cycle was accomplished by evacuation of the vessel to $10^{-4}$ torr by a Tribodyn oil-free molecular drag vacuum pump and cooling to room temperature. FIG. 6 reveals that the isotherm measurements for hydrogen absorption on the $LaNi_5$ gas atomized powder pursuant to the invention (see open triangle and open square data points) are very similar to those of annealed high purity $LaNi_5$ "reference" alloys (see open circle and solid circle data points) made by the conventional technique of mechanical crushing and grinding of chill cast ingot that had been subjected to annealing at about 950 degrees C for a period of approximately 1 month [see Luo et al., Journal of Alloys and Compouunds, V. 202, p. 147–159 (1993)]. The initial cast material was formulated from ultra high purity La and Ni elemental constituents. The data of FIG. 6 illustrate that the as-atomized hydrogen storage powders pursuant to the invention can be made directly from the melt and exhibit high hydrogen absorption characteristics comparable to annealed, high purity materials of like composition.

The manufacture of hydrogen storage powders pursuant to the invention overcomes the disadvantages of the cast, heat treat, and crush technique which in the past has produced inconsistent hydrogen absorption properties as a result of chemical inhomogeneities associated with melt casting/solidification as well as increased cost of hydrogen storage components as a result of the additional manufacturing operations involved, especially the lengthy heat treatment in inert atmosphere of the casting.

Referring to FIG. 7b, a scanning electron micrograph at 500× of as-atomized $LaNi_{4.75}Sn_{0.25}$ hydrogen storage powder pursuant to the present invention in the size range of 1 to 45 microns diameter is shown after 5 gas phase absorption/desorption cycles (cycling involved the same treatment as the "activation" described above in connection with FIG. 6). After such hydrogen absorption/desorption cycling, even powders up to about 30 microns in diameter did not exhibit fracture with this tin modified alloy. As the following discussion will indicate and the micrograph in FIG. 7a shows, unmodified $LaNi_5$ gas atomized powders that were hydrogen-cycled 5 times exhibit cracking in all particles greater than about 10 microns. It is known that hydrogen dilation-induced cracking of LaNi$_5$-type hydrogen storage alloys can be reduced by addition of an alternative transition metal or p-electron element like tin. These alloy modifications reduce the cracking tendency by some base lattice expansion due to Sn substitution for Ni and by decreasing by a small amount the total hydrogen that can be dissolved in the lattice and thereby reducing the possible particle dilation well below the maximum of 25% strain. Moreover, in reference to FIG. 6, a pressure above one or more atmosphere is needed to fully charge the unmodified LaNi$_5$ alloy to about 6 hydrogen atoms per compound formula unit, either as annealed particulate or as gas atomized powders. Alloy modifications like tin are also used to reduce the hydrogen absorption pressure to levels below 1 atmosphere, necessary for battery applications where excessive recharging pressure may cause battery cell explosions. The most desireable modification of the base LaNi$_5$ alloy will contain a sufficient solute level to reduce the hydrogen absorption pressure to about 0.5 atmosphere. This solute level should also avoid decreasing the maximum absorption of hydrogen below about 5 atoms of hydrogen per compound formula unit to retain an adequate electrochemical storage capacity.

The hydrogen storage powders pursuant to the invention advantageously exhibit resistance to fracture upon hydrogen absorption/desorption. This characteristic is important in actual service of hydrogen storage components where particle fracture can lead to degradation of such components as, for example, battery electrodes and thus battery performance as a result of either electrical shorts caused by fractured electrode material bridging the battery separators or simply the result of loss of active material from the electrode. Such electrode degradation adversely affects battery performance.

The hydrogen storage powder particles pursuant to the invention can be used in the as-atomized condition by virtue of their chemical homogeneity, single phase hexagonal crystal structure, fine particle size, and spherical morphology without the need for lengthy annealing heat treatments and size reduction treatments. The preferred gas atomized particle have a segregation-free, single phase solidification microstructure in the as-atomized condition. Also, preferred gas atomized particles are single crystals without grain boundaries or any other type of microstructural discontinuites. This type of powder can be found in the finest fraction of a gas atomized LaNi$_5$ powder batch, usually in powders with diameter smaller than about 10 microns, a result of the maximum rapid solidification effect (solidification rate in excess of the solute partitioning limit) in such powders from the gas atomization process. While argon gas was used in some of the gas atomization experiments described herein, another inert gas, helium, was also used and is preferred because of its much higher yield of fine powders less than about 25 microns and its capacity to boost the particle cooling rate by about 10 times which can enhance further the yield of nearly segregation-free powders. Such fine LaNi$_5$ powder can be used directly in the as-atomized condition, without lengthy annealing because the microstructure is essentially homogeneous. Use of a homogeneous microstructure avoids the formation of microstructural discontinuities during hydrogen absorption/desorption cycling that can lead to formation of cracks, particulate fracturing and premature electrode failure in a battery application. As explained above, modification of the LaNi$_5$ base alloy can increase the maximum useful particle size for gas atomized hydrogen storage particulate by decreasing the maximum hydrogen dilation which induces stresses that cause particle cracking. This alloying benefit can be realized only if the solute addition is sufficently well distributed to allow the microstructure to uniformly absorb hydrogen; i.,e. without excessive cell boundary segregation of the solute.

Figure 10:
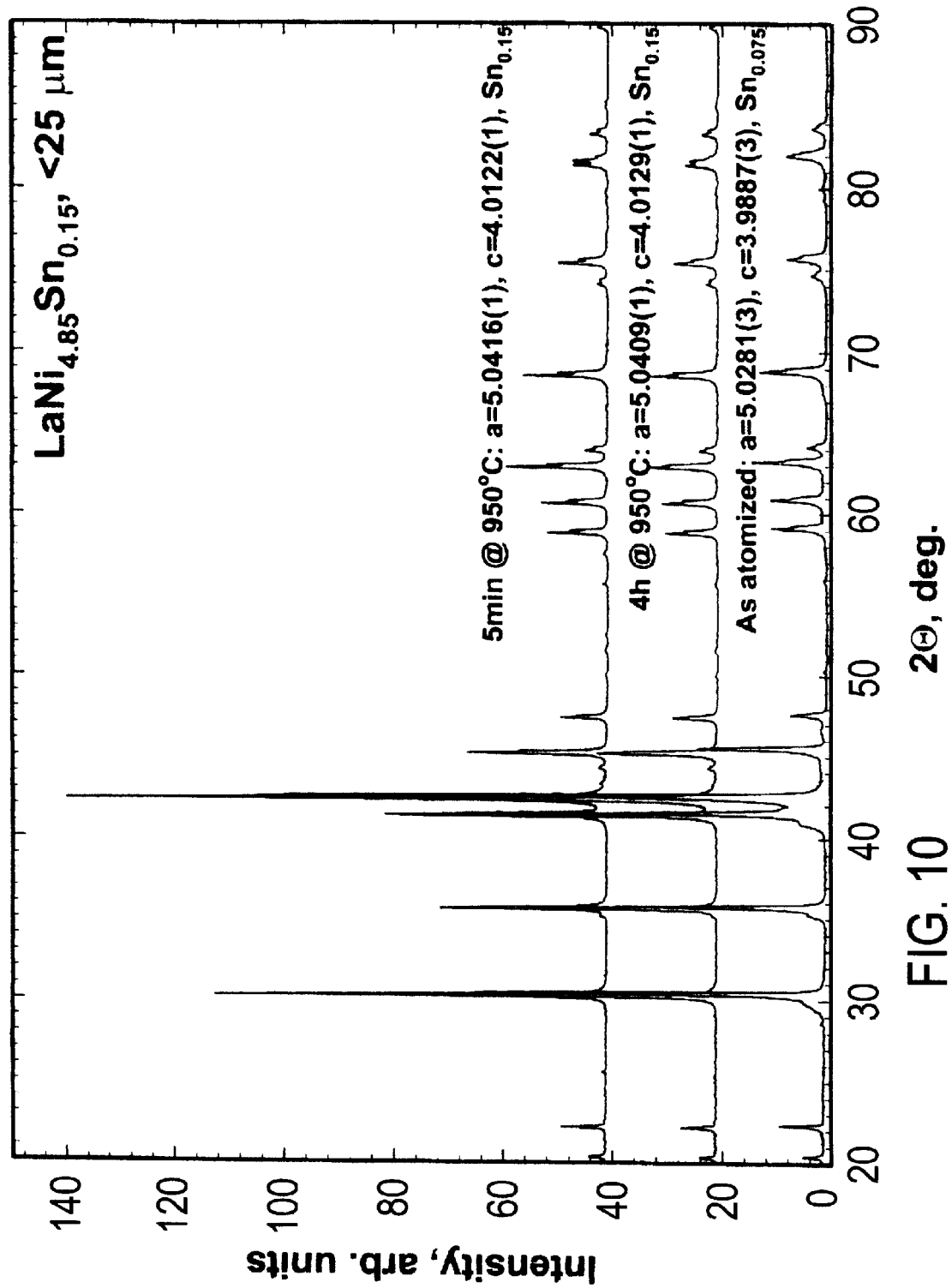
FIG. 10 is an X-ray diffraction pattern summary of as-atomized $LaNi_{4.85}Sn_{0.15}$ powder less than 25 microns diameter heat treated at 5 minutes/950 degrees C pursuant to the invention compared to similar powder heat treated at 4 hours/950 degrees C and to as atomized powder where Sn=0.075, with lattice parameters a, c shown.

Gas atomized LaNi$_5$-type particles with a fine (less than 1 micron cell spacing) cellular solidification microstructure with minimal segregation of Ni or of one or more substitutional alloying constitutent(s); e.g. Co, Al, Mn, Sn, in the as-atomized condition are also suitable. These powders can contain a minor amount of alloy segregation which must be below the limit that restricts sufficient hydrogen absorption or leads to crack formation in the particles in order to use them in the as-atomized condition. Alternatively, gas atomized particles with a fine cellular solidification morphology may be homogenized completely (or to a sufficient extent) by a rapid high temperature (between 800 and 1000 degrees C) annealing treatment, lasting less than 15 minutes, as compared to the hours, days or weeks of annealing required to homogenize chill cast ingots. In fact, as demonstrated by the x-ray diffraction patterns and values of lattice parameters a, c of FIG. 10, a 5 minute anneal at 950 degrees C in a helium atmosphere of LaNi$_{4.85}$Sn$_{0.15}$ powder less than 25 microns diameter produced complete homogenization equivalent to a 4 hour anneal of the same LaNi$_{4.85}$Sn$_{0.15}$ powder, verifying that 5 minutes was all that is required for this powder. This advantage of the invention in reduction of annealing time (and hence processing cost) arises because of a reduction in scale of alloy segregation, from about 20 to about 50 microns for ingot microstructures to about 1 micron or less for the cellular microstructures of gas atomized powders of the invention. Also, the brief anneals can be conducted while the powder is still in the atomization collection containers 15a, 17a within the inert gas processing atmosphere. FIG. 10 also shows the x-ray diffraction pattern of another powder as-atomized having Sn of 0.075 for comparison.

Hydrogen storage components; e.g. packed particulate beds for hydrogen absorption refrigerators or for hydrogen fuel storage, can be made by tap densification of the gas atomized powders after screening to select appropriate size fraction of the powder yield to facilitate gas flow through the bed. The powder bed can be used in the tap dense condition or after a partial sintering treatment to stablize the particles from major shifting of position. For electrochemical storage applications, the gas atomized powders must be consolidated in a plate or sheet electrode form that has mechanical flexibilty and the ability to conduct electrical current. For purposes of illustration of an example of this battery electrode fabrication process, as-atomized powder having the LaNi$_{4.75}$Sn$_{0.25}$ compositon in the size range of less than 75 microns was fabricated into a negative electrode for a Ni/MeH battery test cell by blending 76 volume % activated as-atomized alloy powder, 19 volume % INCO nickel powder as a conductive diluent, and 5 volume % Teflon binder powder and by pressing of the blended powders at 300 degrees C onto an expanded nickel metal screen. Each electrode was produced as a square sheet of about 2.5 mm by 2.5 mm dimensions. NiOOH/Ni(OH)$_2$ served as the positive electrode and a Hg/HgO reference electrode was also used. The electrodes were contained in an o-ring sealed, flooded prismatic glass test cell with a 31 weight % KOH electrolyte solution. The advantage of the AB$_{5+x}$ alloys (e.g. LaNi$_{5.2}$Sn$_{0.3}$) is that the need for a conductive diluent (e.g. nickel powder) in an electrode, for example, may be drastically reduced or eliminated because it is in effect already present within the microstructure of each alloy powder particle as a dispersed second phase.

Figure 8:
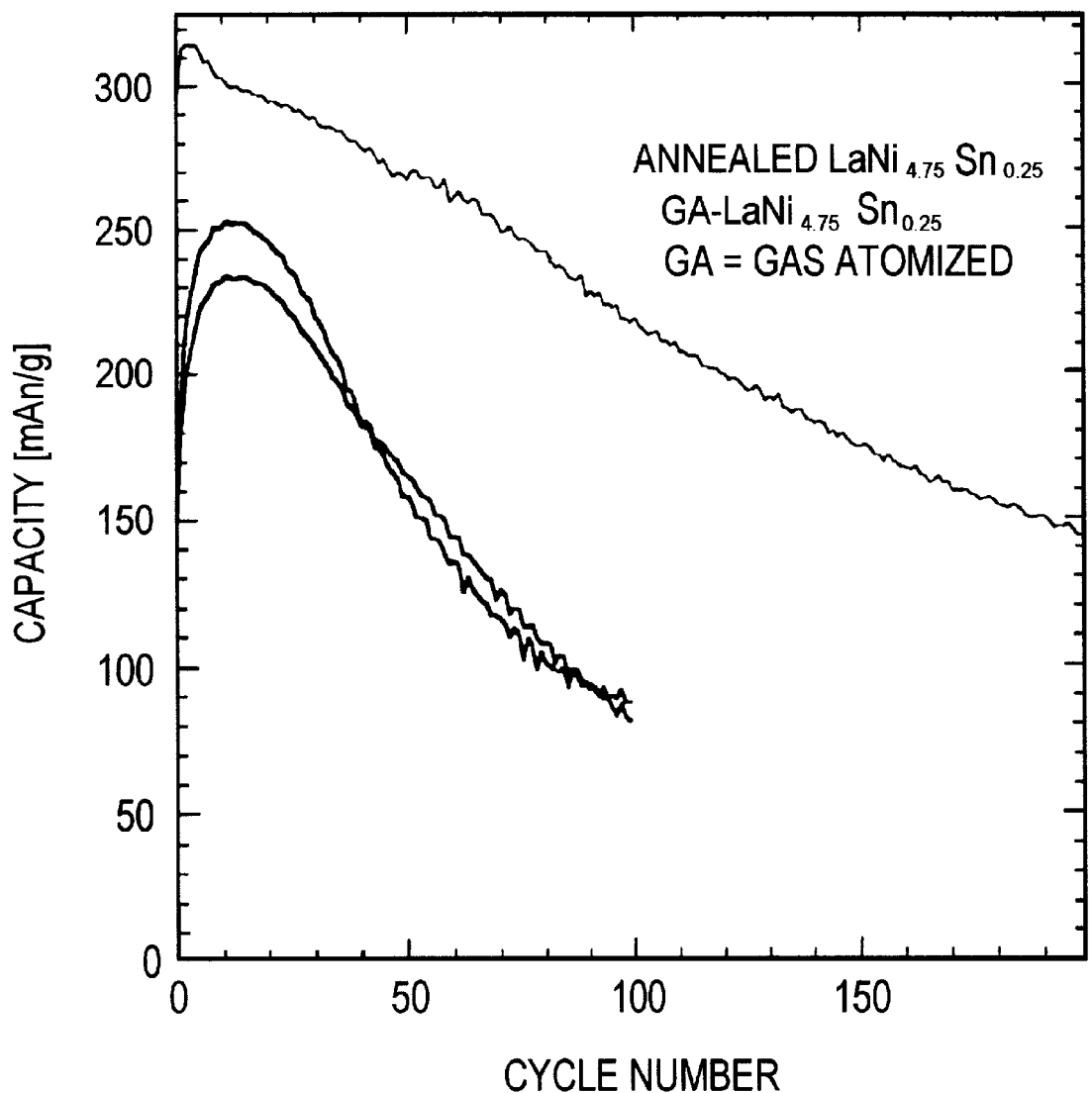
FIG. 8 depicts graphs of hydrogen storage capacity versus number of absorption/desorption cycles for cast/crushed and annealed $LaNi_{4.75}Sn_{0.25}$ hydrogen storage powder and gas atomized (GA) $LaNi_{4.75}Sn_{0.25}$ hydrogen storage powder unannealed pursuant to the present invention.

Referring to FIG. 8, graphs are shown of battery storage capacity for test cell charging and discharging cycles using 2 different cathodes fabricated from $LaNi_{4.75}Sn_{0.25}$ as-atomized powder, as described above, compared to a test cell that used a cathode fabricated from cast/crushed and annealed particulate of the same alloy fabricated in the same manner. The maximum electrochemical storage capacity of the as-atomized powder is only about 15% smaller than that of the extensively annealed particulate made by conventional means. Also, the decrease in electrochemical capacity with repeat charging cycles appears to occur at about the same rate for cathodes made from atomized powder and from annealed particulate. These results indicate that an excess of tin was used to modify the $LaNi_5$ alloy, where a more optimum tin modification (or other suitable solute) can produce equivalent or better results to the conventional cast/crushed and annealed particulate at a much lower process cost. It should be noted that even at the same tin alloying level, the electrochemical capacity results could be improved by selection of powders of smaller size with reduced segregation due to more pronounced rapid solidification effects. Proper alloy design and gas atomization of $LaNi_5$-type powder for battery electrodes will also result in extended battery cycling life by avoidance of the continuous fracturing tendency of conventional cast/crushed particulate.

While the invention has been described in terms of specific embodiments thereof, it is not intended to be limited thereto but rather only to the extent set forth hereafter in the appended claims.

We claim:

1. A method of making hydrogen storage powder, comprising forming a compostionally homogenous melt having an appropriate composition for a hydrogen storage material and gas atomizing the melt under conditions of melt temperature and atomizing gas pressure to form generally spherical powder particles of said hydrogen storage material, and annealing the powder particles for less than about 15 minutes to reduce segregation in the particle microstructure.

2. The method of claim 1 wherein the melt comprises a hydrogen storage material having at least one of the atomic formula $AB_5$ and $AB_{5+x}$ where A can be a lanthanide element and B can be one or more of Co, Ni, Fe, Cu, Mn, Ti, Cr, Nb, Ta and a p-electron element including Al, Si, Ge, B, Sb, Ga, and Sn, where x can be from about −2.5 to about +2.5.

3. The method of claim 2 where the hydrogen storage material is selected from the group consisting of $LaNi_5$, $MmNi_{3.5}Co_{0.8}Al_{0.4}Mn_{0.3}$, $LaNi_{5.2}Sn_{0.3}$, $LaNi_{4.85}Sn_{0.15}$ and $LaNi_{4.75}Sn_{0.25}$.

4. The method of claim 2 wherein the powder particles are formed under conditions to have a single hexagonal phase as atomized.

5. The method of claim 1 wherein the melt is formed by melting hydrogen storage material in ingot form.

6. The method of claim 1 wherein the melt is gas atomized by high pressure inert gas atomization.

7. The method of claim 1 wherein the powder particles are formed in the size range of about 1 to 100 microns diameter.

8. The method of claim 1 wherein the powder particles are formed to have a hexagonal phase as atomized.

9. The method of claim 1 wherein the powder is annealed in a collection container of atomization apparatus.

10. Briefly annealed, atomized hydrogen storage powder particles, comprising at least one of the atomic formula $AB_5$ and $AB_{5+x}$ where A can be a lanthanide element and B can be one or more of Co, Ni, Fe, Cu, Mn, Ti, Cr, Nb, Ta and a p-electron element including Al, Si, Ge, B, Sb, Ga, and Sn, where x can be from about −2.5 to about +2.5, and having a generally spherical as atomized morphology.

11. The powder particles of claim 10 selected from the group consisting of $LaNi_5$, $MmNi_{3.5}Co_{0.8}Al_{0.4}Mn_{0.3}$, $LaNi_{4.75}Sn_{0.25}$, $LaNi_{5.2}Sn_{0.3}$, and $LaNi_{4.85}Sn_{0.15}$.

12. The powder particles of claim 10 having a hexagonal phase as atomized.

13. The powder particles of claim 10 in the size range of about 1 to about 100 microns diameter.

14. A hydrogen storage component resistant to fracture comprising briefly annealed, atomized hydrogen storage powder particles having at least one of the atomic formula $AB_5$ and $AB_{5+x}$ where A can be a lanthanide element and B can be one or more of Co, Ni, Fe, Cu, Mn, Ti, Cr, Nb, Ta and a p-electron element including Al, Si, Ge, B, Sb, Ga, and Sn, where x can be from about −2.5 to about +2.5, and having a generally spherical as atomized morphology.

15. The component of claim 14 wherein said particles are selected from the group consisting of $LaNi_5$, $MmNi_{3.5}Co_{0.8}Al_{0.4}Mn_{0.3}$, $LaNi_{4.75}Sn_{0.25}LaNi_{5.2}Sn_{0.3}$, and $LaNi_{4.85}Sn_{0.15}$.

16. The component of claim 14 wherein said particles have a hexagonal phase as atomized.

17. The component of claim 14 wherein said particles have a conductive second phase dispersed in the microstructure.

18. The component of claim 14 having said particles are in the size range of about 1 to about 100 microns diameter.

19. The component of claim 14 which is an electrode.

20. A hydrogen storage component resistant to fracture comprising consolidated briefly annealed, atomized hydrogen storage powder particles having at least one of the atomic formula $AB_5$ and $AB_{5+x}$ where A can be a lanthanide element and B can be one or more of Co, Ni, Fe, Cu, Mn, Ti, Cr, Nb, Ta and a p-electron element including Al, Si, Ge, B, Sb, Ga, and Sn, where x can be from about −2.5 to about +2.5, and having a generally spherical as atomized morphology.

21. The component of claim 20 wherein the briefly annealed atomized hydrogen storage powder is selected from the group consisting of $LaNi_5$, $MmNi_{3.5}Co_{0.8}Al_{0.4}Mn_{0.3}$, $LaNi_{4.75}Sn_{0.25}$ $LaNi_{5.2}Sn_{0.3}$, and $LaNi_{4.85}Sn_{0.15}$.

22. A method of making a hydrogen storage component resistant to fracture, comprising forming gas atomized hydrogen storage powder particles having at least one of the atomic formula $AB_5$ and $AB_{5+x}$ where A can be a lanthanide element and B can be one or more of Co, Ni, Fe, Cu, Mn, Ti, Cr, Nb, Ta and a p-electron element including Al, Si, Ge, B, Sb, Ga, and Sn, where x can be from about −2.5 to about +2.5 and having a generally spherical as atomized morphology, annealing said powder particles for less than about 30 minutes to reduce segregation in the particle microstructure, and consolidating the powder particles to a component shape.

23. The method of claim 22 wherein the powder is annealed in a collection container of atomization apparatus.

24. A method of making a hydrogen storage component resistant to fracture, comprising forming gas atomized hydrogen storage powder particles having at least one of the atomic formula $AB_5$ and $AB_{5+x}$ where A can be a lanthanide element and B can be one or more of Co, Ni, Fe, Cu, Mn, Ti, Cr, Nb, Ta and a p-electron element including Al, Si, Ge, B, Sb, Ga, and Sn, where x can be from about −2.5 to about +2.5 and having a generally spherical as atomized morphology, annealing said powder particles for less than about 15 minutes to reduce segregation in the particle microstructure, mixing the powder particles with a binder to form a mixture, and consolidating the mixture to a component shape.

25. The method of claim 24 wherein the powder is annealed in a collection container of atomization apparatus.

26. The method of claim 1 wherein the powder particles are annealed at 800 to 1000 degrees C.

27. The method of claim 22 wherein the powder particles are annealed at 800 to 1000 degrees C.

28. The method of claim 24 wherein the powder particles are annealed at 800 to 1000 degrees C.

* * * * *

UNITED STATES PATENT AND TRADEMARK OFFICE
CERTIFICATE OF CORRECTION

PATENT NO.   : 6,074,453
DATED        : June 13, 2000
INVENTOR(S)  : Iver E. Anderson et al.

It is certified that error appears in the above-identified patent and that said Letters Patent is hereby corrected as shown below:

Column 12:
Line 27, change "having" to ---wherein---.
Line 39, delete "wherein the briefly".
Line 40, delete "annealed atomized hydrogen storage powder is".

Signed and Sealed this

Twenty-six Day of June, 2001

*Attest:*

*Attesting Officer*

NICHOLAS P. GODICI
*Acting Director of the United States Patent and Trademark Office*